United States Patent [19]

Hoy et al.

[11] Patent Number: 5,211,342
[45] Date of Patent: May 18, 1993

[54] ELECTROSTATIC LIQUID SPRAY APPLICATION OF COATINGS WITH SUPERCRITICAL FLUIDS AS DILUENTS AND SPRAYING FROM AN ORIFICE

[75] Inventors: Kenneth L. Hoy, St. Albans; Kenneth A. Nielsen, Charleston, both of W. Va.

[73] Assignee: Union Carbide Chemicals & Plastics Technology Corporation, Danbury, Conn.

[21] Appl. No.: 820,492

[22] Filed: Jan. 14, 1992

Related U.S. Application Data

[60] Division of Ser. No. 506,529, Apr. 6, 1990, Pat. No. 5,106,650, which is a continuation of Ser. No. 218,896, Jul. 14, 1988, abandoned.

[51] Int. Cl.[5] .......................... B05B 5/02; B05B 1/04
[52] U.S. Cl. .................................. 239/707; 239/706; 239/135; 239/428; 427/385.5
[58] Field of Search ............................ 239/690–706, 239/128, 132, 136, 137, 428, 416.1, 575, 590; 427/385.5

[56] References Cited

U.S. PATENT DOCUMENTS

| | | | |
|---|---|---|---|
| 2,980,339 | 4/1961 | Bok et al. | 239/304 X |
| 3,079,090 | 2/1963 | Decker | 239/304 |
| 3,146,950 | 9/1964 | Lancaster | 239/304 |
| 3,414,424 | 12/1965 | Peeps et al. | 239/290 X |
| 3,421,694 | 1/1969 | Muller | 239/304 |
| 4,004,733 | 1/1977 | Law | 239/290 X |
| 4,113,182 | 9/1978 | Brago | 239/301 |
| 4,124,528 | 11/1978 | Modell . | |
| 4,189,914 | 2/1980 | Marek et al. . | |
| 4,204,612 | 5/1980 | Sohrader et al. | 239/128 X |
| 4,375,387 | 3/1983 | deFilippi et al. . | |
| 4,376,512 | 3/1983 | Kistner | 239/304 X |
| 4,433,003 | 2/1984 | Gourdine | 239/706 X |
| 4,509,694 | 4/1985 | Incoulet et al. | 239/704 X |
| 4,537,357 | 8/1985 | Culbertson et al. | 239/290 |
| 4,582,731 | 4/1986 | Smith . | |
| 4,618,098 | 10/1986 | Hedger et al. | 239/290 |
| 4,619,735 | 10/1986 | Norton . | |
| 4,659,011 | 4/1987 | Moos | 239/704 X |
| 4,734,227 | 3/1988 | Smith . | |
| 4,734,451 | 3/1988 | Smith . | |
| 4,737,334 | 4/1988 | Murthy et al. . | |

FOREIGN PATENT DOCUMENTS

| | | |
|---|---|---|
| 1777353 | 12/1972 | Fed. Rep. of Germany ...... 239/707 |
| 2603664 | 8/1977 | Fed. Rep. of Germany . |
| 2853066 | 6/1980 | Fed. Rep. of Germany . |
| 55-84328 | 6/1980 | Japan . |
| 58-168674 | 10/1983 | Japan . |
| 59-16703 | 1/1984 | Japan . |
| 62-152505 | 7/1987 | Japan . |
| 868051 | 4/1988 | South Africa . |

OTHER PUBLICATIONS

Francis, A. W., "Ternary Systems of Liquid Carbon Dioxide", J. Phys. Chem. 58:1099, Dec., 1954.
(List continued on next page.)

Primary Examiner—Andres Kashnikow
Assistant Examiner—Kevin P. Weldon
Attorney, Agent, or Firm—M. N. Reinisch

[57] ABSTRACT

An electrostatic liquid coatings application process and apparatus is provided in which supercritical fluids, such as supercritical carbon dioxide fluid, are used to reduce to application consistency viscous coatings compositions to allow for their application as liquid sprays. The coatings compositions are sprayed by passing the composition under pressure through an orifice into the environment of the substrate. The liquid spray is electrically charged by applying a high electrical voltage relative to the substrate and electric current.

**16

OTHER PUBLICATIONS

Smith, R. D., et al., "Direct Fluid Injection Interface for Capillary Supercritical Fluid Chromatography-Mass Spectrometry J. Chromatog." 247 (1982):231-243.

Krukonis, V., "Supercritical Fluid Nucleation of Difficult-to-Comminute Solids", paper presented at 1984 Annual Meeting, AIChE, San Francisco, California, Nov. 25-30, 1984.

Dandage, D. K., et al., "Structure Solubility Correlations: Organic Compounds and Dense Carbon Dioxide Binary Systems", Ind. Eng. Chem. Prod. Res. Dev. 24: 162-166 (1985).

Matson, D. W., et al., "Production of Powders and Films by the Rapid Expansion of Supercritical Solutions", J. Materials Science 22: 1919-1928 (1987).

McHugh, M. A. et al., "Supercritical Fluid Extraction, Principles and Practice", Butterworth Publishers (1986).

Cobbs, W. et al., "High Solids Coatings Above 80% By Volume", Water-Borne & High Solids Coatings Symposium, Mar., 1980.

Matson, D. W. et al., "Production of Fine Powders by the Rapid Expansion of Supercritical Fluid Solutions", Advances in Ceramic, vol. 21, pp. 109-121 (1987).

Kitamura, Y., et al., "Critical Superheat for Flashing of Super-heated Liquid Jets", Ind. Eng. Chem. Fund. 25:206-211 (1986).

Petersen, R. C. et al., "The Formation of Polymer Fibers From the Rapid Expansion of SCF Solutions" Pol. Eng & Sci. (1987) V. 27 p. 1.

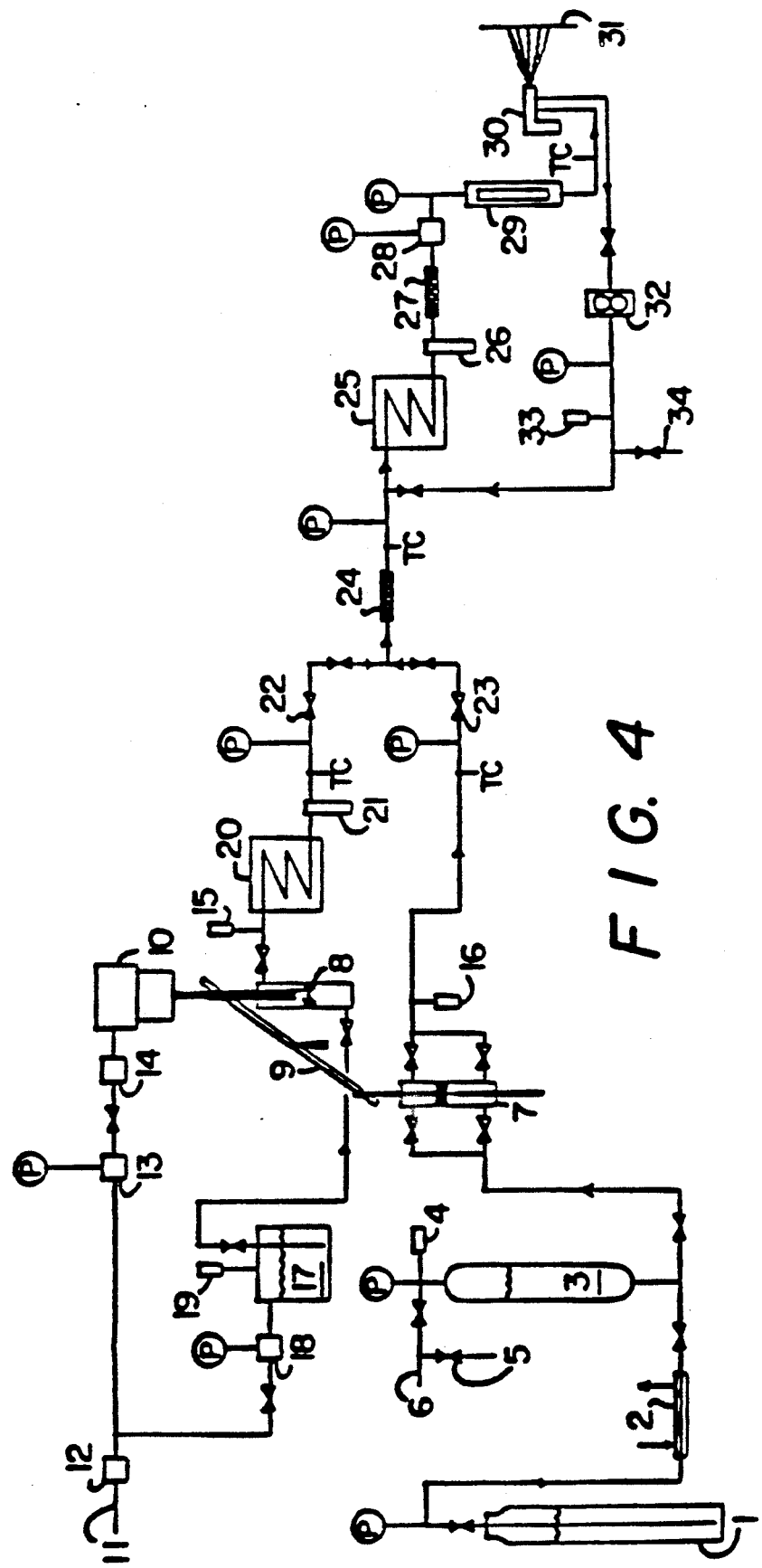
F I G. 4

ELECTROSTATIC LIQUID SPRAY APPLICATION OF COATINGS WITH SUPERCRITICAL FLUIDS AS DILUENTS AND SPRAYING FROM AN ORIFICE

This application is a division of prior U.S. application Ser. No. 07/506,529, filed Apr. 6, 1990, now U.S. Pat. No. 5,106,650, which is a continuation of application Ser. No. 218,896, filed Jul. 14, 1988, abandoned.

FIELD OF THE INVENTION

This invention relates in general to a process and apparatus for coating substrates. More particularly, this invention is directed to a process and apparatus for coating substrates by a liquid spray in which 1) supercritical fluid, such as supercritical carbon dioxide fluid, is used as a viscosity reduction diluent for coating formulations and 2) the mixture of supercritical fluid and coating formulation is passed under pressure through an orifice into the environment of the substrate to form the liquid spray, and 3) the liquid is electrically charged by a high electrical voltage relative to the substrate.

BACKGROUND OF THE INVENTION

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air-assisted airless spray.

Air spray uses compressed air to break up the liquid coating formulation into droplets and to propel the droplets to the substrate. The most common type of air nozzle mixes the coating formulation and high-velocity air outside of the nozzle to gauge atomization. Auxiliary air streams are used to modify the shape of the spray. The coating formulation flows through the liquid orifice in the spray nozzle with relatively little pressure drop. Siphon or pressure feed, usually at pressures less than 18 psi, are used, depending upon the viscosity and quantity of coating formulation to be sprayed.

Airless spray uses a high pressure drop across the orifice to propel the coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air assisted airless spray can also be used with the liquid coating formulation heated or with the air heated or with both heated. Heating reduces the viscosity of the liquid coating formulation and aids atomization.

Electrostatic forces are commonly utilized with orifice sprays such as air spray, airless spray, and air-assisted airless spray to increase the proportion of liquid coating that is deposited onto the substrate from the liquid spray. This is commonly referred to as increasing the transfer efficiency. This is done by using a high electrical voltage relative to the substrate to impart a negative electrical charge to the liquid. The substrate is electrically grounded. This creates an electrical force of attraction between the liquid spray droplets and the substrate, which causes droplets that would otherwise miss the substrate to be deposited onto it. When the electrical force causes droplets to be deposited on the edges and backside of the substrate, this effect is commonly referred to as wrap around. The substrate should be electrically conducting or be given a conducting surface before being sprayed.

The liquid can be electrically charged at any stage of the spray formation process. It can be charged by applying high electrical voltage and electrical current 1) within the spray gun, by direct contact with electrified walls or internal electrodes before passing through the orifice; 2) as the liquid emerges from the orifice, by electrical discharge from external electrodes located near the orifice and close to the spray; or 3) away from the orifice, by passing the liquid spray through or between electrified grids or arrays of external electrodes before the spray reaches the substrate.

Electrically charging the liquid as it emerges from the orifice is widely used. Usually a short sharp-pointed metal wire, which extends from the spray nozzle to beside the spray, is used as the electrode. When a high electrical voltage is applied to the electrode, electrical current flows from the point of the electrode to the liquid spray, which becomes charged. This method is used for air spray, airless spray, and air-assisted airless spray guns. It is used for both hand spray guns and automatic spray guns. Generally the electrical voltage ranges from 30 to 150 kilovolts. Coating formulations that are sufficiently conductive will leak electrical charge through the fluid to the material supply system; these systems must be isolated from electrical ground so that the system itself becomes electrified. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 100 microamperes and optimum results are obtained with coating formulations that have very low electrical conductivity, that is, very high electrical resistance.

U.S. Pat. Nos. 3,556,411; 3,647,147; 3,754,710; 4,097,000; and 4,346,849 disclose spray nozzles and tips for use in airless spray, including designs and methods of manufacture and methods of promoting turbulence in the atomizing fluid. U.S. Pat. No. 3,659,787 discloses a spray nozzle and use of electrostatics for airless spray. U.S. Pat. Nos. 3,907,202 and 4,055,300 disclose spray nozzles and use of electrostatics for air assisted airless spray. None of these patents uses supercritical fluids as diluents to spray coating formulations.

More information about orifice sprays such as air spray, airless spray, and air-assisted airless spray, about heated orifice sprays, and about electrostatic spraying can be obtained from the general literature of the coating industry and from technical bulletins issued by spray equipment manufacturers, such as the following references:

1. Martens, C. R., Editor. 1974. Technology of Paints, Varnishes and Lacquers. Chapter 36. Application. Robert E. Krieger Publishing Company, Huntington, N.Y.
2. Fair, James. 1983. Sprays. Pages 466–483 in Grayson, M., Editor. Kirk-Othmer Encyclopedia of Chemical Technology. Third Edition. Volume 21. Wiley-Interscience, New York.
3. Zinc, S. C. 1979. Coating Processes. Pages 386–426 in Grayson, M., Editor. Kirk-Othmer Encyclopedia of Chemical Technology. Third Edition. Volume 6. Wiley Interscience, New York.
4. Long, G. E. 1978 (March 13). Spraying Theory and Practice. Chemical Engineering: 73–77.
5. Technical Bulletin. Air Spray Manual. TD10-2R. Binks Manufacturing Company, Franklin Park, Ill.
6. Technical Bulletin. Compressed Air Spray Gun Principles. TD10-1R-4. Binks Manufacturing Company, Franklin Park, Ill.
7. Technical Bulletin. Airless Spray Manual. TD11-2R. Binks Manufacturing Company, Franklin Park, Ill.
8. Technical Bulletin. Airless Spraying. TD11-1R-2. Binks Manufacturing Company, Franklin Park, Ill.
9. Technical Bulletin. Electrostatic Spraying. TD17-1R. Binks Manufacturing Company, Franklin Park, Ill.
10. Technical Bulletin. Hot Spraying. TD42-1R-2. Binks Manufacturing Company, Franklin Park, Ill.
11. Technical bulletin on air-assisted airless spray painting system. Kremlin, Incorporated, Addison, Ill.

Prior to the present invention, electrostatic liquid spray application of coatings, such as lacquers, enamels, and varnishes, by the spray methods discussed above was effected solely through the use of organic solvents as viscosity reduction diluents. However, because of increased environmental concern, efforts have been directed to reducing the pollution resulting from painting and finishing operations. For this reason there is great need for new electrostatic liquid spray technology for application of coatings that diminishes the emission of organic solvent vapors.

U.S. Pat. No. 4,582,731 (Smith) discloses a method and apparatus for the deposition of thin films and the formation of powder coatings through the molecular spray of solutes dissolved in organic and supercritical fluid solvents. The molecular sprays disclosed in the Smith patent are composed of droplets having diameters of about 30 Angstroms. These droplets are more than $10^6$ to $10^9$ less massive than the droplets formed in conventional application methods that Smith refers to as "liquid spray" applications. Furthermore, the orifice used to produce the molecular sprays is typically in the 1 to 4 micron diameter size range. These orifice sizes are $10^3$ to $10^5$ times smaller in area than orifices used in conventional "liquid spray" apparatus. This disclosed method of depositing thin films seeks to minimize, and preferably eliminate, the presence of solvent within the film deposited upon a substrate. This result is preferably accomplished through the maintenance of reduced pressure in the spray environment. However, the maintenance of reduced pressures is not feasible for most commercial coating applications. Furthermore, the spray method disclosed by Smith utilizes very high solvent-to-solute ratios, thereby requiring undesirably high solvent usage and requiring prohibitively long application times in order to achieve coatings having sufficient thicknesses to impart the desired durability of the coating. Finally, Smith does not apply electrostatics to his molecular spray process.

U.S. patent application Ser. No. 133.068, filed Dec. 21, 1987, (Hoy et al) discloses a process and apparatus for the liquid spray application of coatings to a substrate wherein the use of environmentally undesirable organic diluents is minimized. The process of the invention comprises:

(1) forming a liquid mixture in a closed system, said liquid mixture comprising:
   (a) at least one polymeric compound capable of forming a coating on a substrate; and
   (b) at least one supercritical fluid, in at least an amount which when added to (a) is sufficient to render the viscosity of said mixture of (a) and (b) to a point suitable for spray applications;
(2) spraying said liquid mixture onto a substrate to form a liquid coating thereon. The invention is also directed to a liquid spray process as described immediately above to which at least one active organic solvent (c) is admixed with (a) and (b), prior to the liquid spray application of the resulting mixture to a substrate. The preferred supercritical fluid is supercritical carbon dioxide fluid. The apparatus of the invention comprises an apparatus in which the mixture of the components of the liquid spray mixture can be blended and sprayed onto an appropriate substrate. Said apparatus is comprised of, in combination:
   (1) means for supplying at least one polymeric compound capable of forming a continuous, adherent coating;
   (2) means for supplying at least one active organic solvent;
   (3) means for supplying supercritical carbon dioxide fluid;
   (4) means for forming a liquid mixture of components supplied from (1)–(3);
   (5) means for spraying said liquid mixture onto a substrate.

The apparatus further comprises (6) means for heating any of said components and/or said liquid mixture of components. Hoy et al demonstrate the use of supercritical fluids, such as supercritical carbon dioxide fluid, as diluents in highly viscous organic solvent borne and/or highly viscous non aqueous dispersions coatings compositions to dilute these compositions to application viscosity required for liquid spray techniques. They further demonstrate that the method is generally applicable to all organic solvent borne coatings systems. However, they do not teach the means for spraying and do not apply electrostatics.

Supercritical carbon dioxide fluid is an environmentally safe, non-polluting diluent that allows utilization of the best aspects of organic solvent borne coatings applications and performance while reducing the environmental concerns to an acceptable level. It allows the requirements of shop-applied and field-applied liquid spray coatings as well as factory-applied finishes to be met and still be in compliance with environmental regulations.

Clearly what is needed is an electrostatic liquid spray method of coating substrates that can be applied to using supercritical fluids, such as supercritical carbon dioxide fluid, as diluents to reduce coating formulations to spray viscosity. Such a method should utilize the properties of the supercritical fluid, should be compatible with existing spray technology and practice, and should be environmentally acceptable.

Prior to the present invention, it was unknown if electrostatics could be used with polymeric liquid spray mixtures that contain a high concentration of highly volatile supercritical fluid like supercritical carbon dioxide fluid. It was surmised that the spray mixture would be too electrically conductive to apply a high electrical voltage to without having to electrically isolate the material supply and fluid delivery equipment, which are normally electrically grounded, to prevent leakage of electrical charge from the spray. Measurement of the electrical conductivity of supercritical or liquid carbon dioxide could not be found in the literature to predict the effect on the conductivity of the spray mixture. It was expected that the rapid volatization of the supercritical carbon dioxide fluid from the spray (upon exiting the orifice) would create a strong enough counter flow to blow the charging electrical current, coming from the external electrode, away from the spray and prevent the spray from becoming electrically charged. Alternatively, it was anticipated that the counter flow would reduce or limit the electrical charge level that could be applied to the spray. If the liquid spray droplets were charged, it was considered likely that volatization of the supercritical fluid dissolved in the droplets would increase the rate of loss of the electrical charge from the droplets and thereby reduce the electrical attraction between the droplets and the substrate, which would reduce transfer efficiency and electrical wrap around. Furthermore, rapid cooling of the spray caused by depressurization of the supercritical fluid predictably would lower spray temperature to below the dew point and condense moisture onto the droplets, which would also increase the rate of electrical charge loss from the droplets. It was expected that the expansion of the supercritical fluid from the spray would enhance the amount of coating material that issues from the periphery of the spray as electrically charged mist, which would be electrically deposited onto surrounding objects, such as the operator, instead of on the substrate. This result might be hazardous to the operator and prevent the safe use of electrostatic hand spraying. Finally, it was expected that the supercritical fluid spray, which tends to widen more than normal sprays, would hit the external electrode and deposit spray material onto it. The deposited material would be entrained into the spray as large drops or foam and damage the coating on the substrate. The deposited material might also interfere with the charging current given off from the electrode and thereby prevent charging of the spray. If the electrode were moved farther away, to keep the spray from hitting it, it would probably be too far away to effectively charge the spray.

Surprisingly, however, it has been discovered that electrostatic liquid sprays can be formed by using supercritical fluids as viscosity reduction diluents, that the electrical forces can be used to increase the proportion of coating formulation that is deposited onto the substrate, and that such electrostatic sprays can be used to deposit quality coherent polymeric coatings onto substrates.

It is accordingly an object of the present invention to demonstrate the use of electrostatic orifice sprays, such as airless spray and air-assisted airless spray, to apply liquid coatings to substrates by liquid sprays in which supercritical fluids, such as supercritical carbon dioxide fluid, are used as diluents in highly viscous organic solvent borne and/or highly viscous non-aqueous dispersions coatings compositions to dilute these compositions to application viscosity.

It is also an object of the present invention to demonstrate the use of electrostatic forces with said orifice sprays, coating compositions, and supercritical fluid diluents to increase the proportion of liquid coating that is deposited onto the substrate from the spray.

A further object of the invention is to demonstrate that the method is generally applicable to all organic solvent borne coatings systems.

These and other objects will readily become apparent to those skilled in the art in the light of the teachings herein set forth.

SUMMARY OF THE INVENTION

In its broad aspect, this invention is directed to a process and apparatus for the electrostatic liquid spray application of coatings to a substrate wherein the use of environmentally undesirable organic diluents and other volatile organic compounds is diminished. The process of the invention comprises:

(1) forming a liquid mixture in a closed system, said liquid mixture comprising:
   (a) at least one polymeric component capable of forming a coating on a substrate; and
   (b) a solvent component containing at least one supercritical fluid, in at least an amount which when added to (a) is sufficient to render the viscosity of said mixture to a point suitable for spray application;

(2) spraying said liquid mixture onto a substrate to form a liquid coating thereon by passing the mixture under pressure through an orifice into the environment of the substrate to form a liquid spray; and (3) electrically charging the liquid by a high electrical voltage relative to the substrate and electric current.

The invention is also directed to an electrostatic liquid spray process as described immediately above to which at least one active organic solvent (c) is admixed with (a) and (b), prior to the electrostatic liquid spray application of the resulting mixture to a substrate.

The invention is also directed to an electrostatic liquid spray process as described above to which pigments, pigment extenders, metallic flakes, fillers, drying agents, antifoaming agents, antiskinning agents, wetting agents, ultraviolet absorbers, cross-linking agents, and other additives well known in the art are admixed with (a) and (b) and optionally (c), prior to the electrostatic liquid spray application of the resulting mixture to a substrate.

The invention is also directed to an electrostatic liquid spray process as described above to which turbulent or agitated flow is promoted in the liquid mixture, prior to passing the liquid mixture under pressure through the orifice, to aid atomization.

The invention is also directed to an electrostatic liquid spray process as described above to which compressed gas, such as compressed air or compressed carbon dioxide, is used to assist formation and atomization of the liquid spray and to modify the shape of the liquid spray.

The invention is also directed to an electrostatic liquid spray process a described above to which the liquid mixture is heated or the compressed assist gas is heated or both are heated to prevent adverse effect caused by rapid cooling when the liquid mixture is sprayed.

The invention is also directed to an apparatus in which the mixture of the components of the liquid spray can be blended and electrostatically sprayed onto an appropriate substrate.

DESCRIPTION OF THE DRAWINGS

A more detailed understanding of the invention will be had by reference to the drawings wherein:

FIG. 4 is a schematic diagram of a continuous spray apparatus that can be used in the practice of the present invention.

DESCRIPTION OF THE INVENTION

Figure 1:
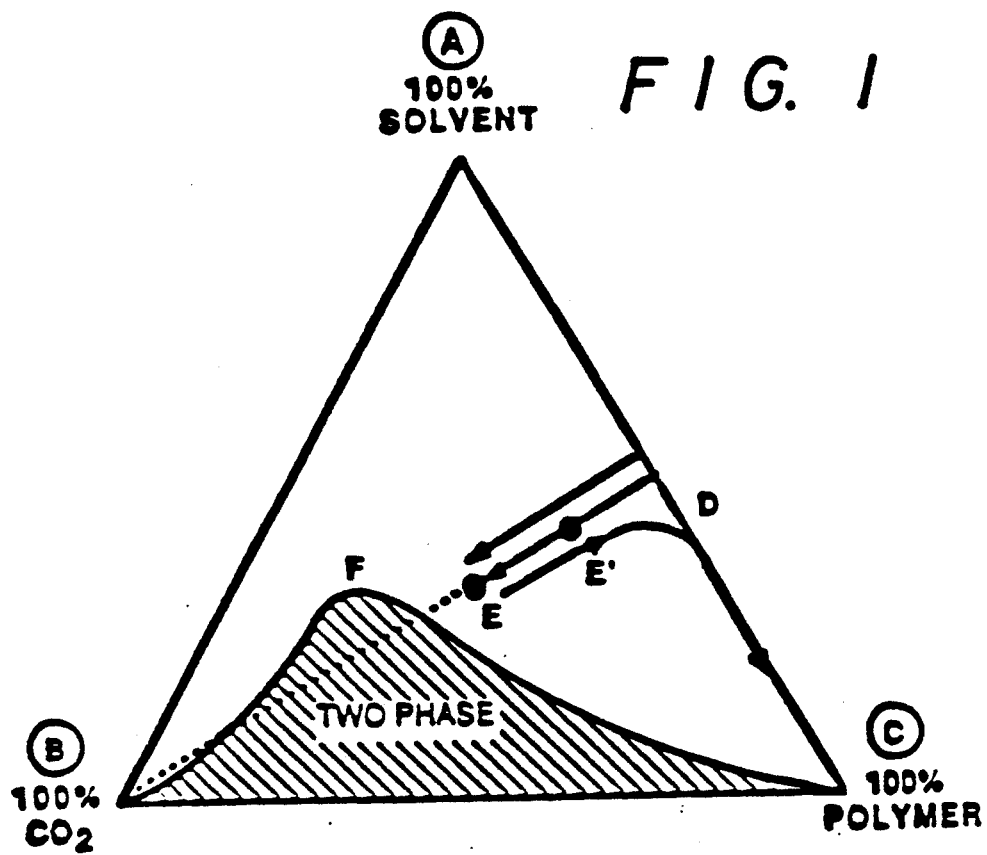
FIG. 1 is a phase diagram of supercritical carbon dioxide fluid spray coating.
Figure 1A:
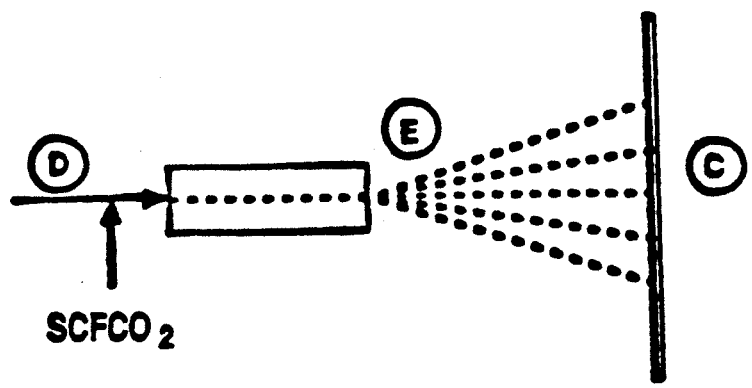
FIG. 1a illustrates schematically, spraying supercritical carbon dioxide.

It has been found that by using the process and apparatus of the present invention, coatings can be applied to a wide variety of substrates in a manner that poses a reduced environmental hazard. Consequently, the use of organic diluents as vehicles for coating formulations can be greatly reduced by utilizing supercritical fluids, such as supercritical carbon dioxide fluid, therewith.

Because of its importance to the claimed process, a brief discussion of relevant supercritical fluid phenomena is warranted.

At high pressures above the critical point, the resulting supercritical fluid, or "dense gas", will attain densities approaching those of a liquid and will assume some of the properties of a liquid. These properties are dependent upon the fluid composition, temperature, and pressure.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures.

An interesting phenomenon associated with supercritical fluids is the occurrence of a "threshold pressure" for solubility of a high molecular weight solute. As the pressure is increased, the solubility of the solute will often increase by many orders of magnitude with only a small pressure increase.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure of that compound.

Examples of compounds that are known to have utility as supercritical fluids are given in Table 1.

TABLE 1

| EXAMPLES OF SUPERCRITICAL SOLVENTS | | | | |
|---|---|---|---|---|
| Compound | Boiling Point (C) | Critical Temperature (C) | Critical Pressure (atm) | Critical Density (g/ml) |
| Carbon Dioxide | −78.5 | 31.3 | 72.9 | 0.448 |
| Ammonia | −33.35 | 132.4 | 112.5 | 0.235 |
| Water | 100.0 | 374.15 | 218.3 | 0.315 |
| Nitrous Oxide | −88.56 | 36.5 | 71.7 | 0.45 |
| Xenon | −108.2 | 16.6 | 57.6 | 0.118 |
| Krypton | −153.2 | −63.8 | 54.3 | 0.091 |
| Methane | −164.0 | −82.1 | 45.8 | 0.2 |
| Ethane | 88.63 | 32.28 | 48.1 | 0.203 |
| Ethylene | −103.7 | 9.21 | 49.7 | 0.218 |
| Propane | 42.1 | 96.67 | 41.9 | 0.217 |
| Pentane | 36.1 | 96.6 | 33.3 | 0.232 |
| Methanol | 64.7 | 40.5 | 78.9 | 0.272 |
| Ethanol | 78.5 | 43.0 | 63.0 | 0.276 |
| Isopropanol | 82.5 | 35.3 | 47.0 | 0.273 |
| Isobutanol | 108.0 | 75.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

The utility of any of the above-mentioned compounds as supercritical fluids in the practice of the present invention will depend upon the polymeric compound(s) and active solvent(s) used, because the spray temperature should not exceed the temperature at which significant thermal degradation of any component of the liquid spray mixture occurs.

Supercritical carbon dioxide fluid and supercritical nitrous oxide fluid are the preferred supercritical fluids in the practice of the present invention due to their low supercritical temperature, low toxicity, nonflammability, and much lower cost than xenon or krypton. Supercritical carbon dioxide fluid is the most preferred supercritical fluid because it has low cost, is readily available, and is highly acceptable environmentally. However, use of any of the aforementioned supercritical fluids and mixtures thereof are to be considered within the scope of the present invention.

The solvency of supercritical carbon dioxide fluid is like that of a lower aliphatic hydrocarbon (e.g. butane, pentane, or hexane) and, as a result, one can consider supercritical carbon dioxide fluid as a replacement for the hydrocarbon diluent portion of a conventional solvent borne coating formulation. Moreover, while lower aliphatic hydrocarbons are much too volatile for use in conventional coatings formulations because of the inherent explosive and fire hazard they present, carbon dioxide is non-flammable, non-toxic, and environmentally acceptable. Safety benefits therefore also result from its use in the claimed process.

The polymeric components suitable for use in this invention as coating materials are any of the polymers known to those skilled in the coatings art. Again, the only limitation of their use in the present invention is their degradation at the temperatures or pressures involved with their admixture with the supercritical fluid. They may be thermoplastic or thermosetting materials.

They may be crosslinkable film forming systems. The polymeric components include vinyl, acrylic, styrenic, and interpolymers of the base vinyl, acrylic, and styrenic monomers; polyesters, oil-free alkyds, alkyds, and the like; polyurethanes, two package polyurethanes, oil-modified polyurethanes, moisture-curing polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; and enamels, varnishes, and lacquers. Also included are mixtures of the above coating materials commonly used and known to those skilled in the art that are formulated to achieve performance and cost balances required of commercial coatings.

The polymer component of the coating composition is generally present in amounts ranging from 5 to 65 weight percent, based upon the total weight of the polymer(s), solvent(s), and supercritical fluid diluent. Preferably, the polymer component should be present in amounts ranging from about 15 to about 55 weight percent on the same basis.

The supercritical fluid diluent should be present in such amounts that a liquid mixture is formed that possesses such a viscosity that it may be applied as an electrostatic liquid spray. Generally, this requires the mixture to have a viscosity of less than about 300 centipoise at spray temperature. Preferably, the viscosity of the mixture of components ranges from about 5 centipoise to about 150 centipoise. Most preferably, the viscosity of the mixture of components ranges from about 10 centipoise to about 50 centipoise.

If supercritical carbon dioxide fluid is employed as the supercritical fluid diluent, it preferably should be present in amounts ranging from about 10 to about 60 weight percent based upon the total weight of components (a), (b), and (c), thereby producing a mixture having viscosities from about 5 centipoise to about 150 centipoise at spray temperature. Most preferably, it is present in amounts ranging from about 20 to about 60 weight percent on the same basis, thereby producing a mixture of components (a), (b), and (c) having viscosities from about 10 centipoise to about 50 centipoise at spray temperature.

If a polymeric component is mixed with increasing amounts of supercritical fluid in the absence of hydrocarbon solvent, the composition may at some point separate into two distinct phases. This perhaps is best illustrated by the phase diagram in FIG. 1 wherein the supercritical fluid is supercritical carbon dioxide fluid. In FIG. 1 the vertices of the triangular diagram represent the pure components of the coating formulation. Vertex A is the active solvent, vertex B carbon dioxide, and vertex C the polymeric material. The curved line BFC represents the phase boundary between one phase and two phases. The point D represents a possible composition of the coating formulation before the addition of supercritical carbon dioxide fluid. The point E represents a possible composition of the coating formulation. The addition of supercritical carbon dioxide fluid has reduced the viscosity of the viscous coatings composition to a range where it can be readily atomized by passing it through an orifice such as in an electrostatic airless spray gun. After atomization, a majority of the carbon dioxide vaporizes, leaving substantially the composition of the original viscous coatings formulation.

Upon contacting the substrate, the remaining liquid mixture of polymer and solvent(s) component(s) will flow to produce a uniform, smooth film on the substrate. The film forming pathway is illustrated in FIG. 1 by the line segments EE'D (atomization and decompression) and DC (coalescence and film formation).

Figure 2:
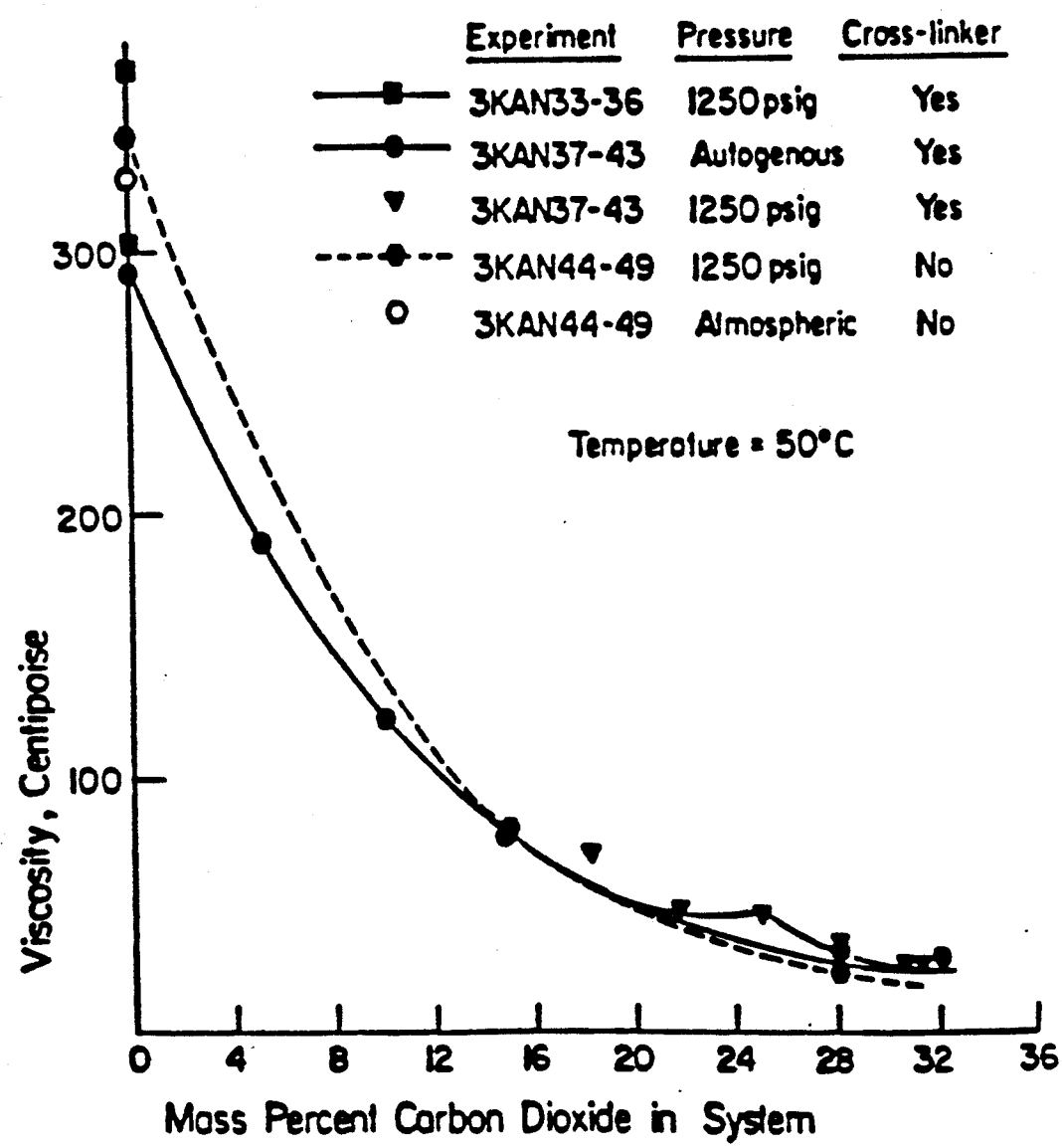
FIG. 2 is a graph illustrating the viscosity versus composition relationship for 65 percent viscous polymer solution in methyl amyl ketone.

Viscosity reduction brought about by adding supercritical carbon dioxide fluid to a viscous coatings composition is illustrated in FIG. 2. The viscous coating composition of 65 percent polymer solution in methyl amyl ketone, which corresponds to point D in FIG. 1, has a viscosity of about 300 centipoise and the solution is unsprayable. Adding supercritical carbon dioxide fluid to the coating composition reduces the viscosity such that a liquid mixture that contains 28 percent supercritical carbon dioxide fluid, which corresponds to point E in FIG. 1, has a viscosity of less than 30 centipoise; the mixture readily forms a liquid spray by passing it through an orifice in an electrostatic airless spray gun. The pressure is 1250 psi and the temperature is 50° C. The polymer is Acryloid TM AT-400, a product of Rohm and Haas Company, which contains 75 percent nonvolatile acrylic polymer dissolved in 25 percent methyl amyl ketone.

The active solvent(s) suitable for the practice of this invention generally include any solvent or mixture of solvents that is miscible with the supercritical fluid and is a good solvent for the polymer system. It is recognized that some organic solvents, such as cyclohexanol, have utility as both conventional solvents and as supercritical fluid diluents. As used herein, the term "active solvent" does not include solvents in the supercritical state.

Among suitable active solvents are: ketones such as acetone, methyl ethyl ketone, methyl isobutyl ketone, mesityl oxide, methyl amyl ketone, cyclohexanone, and other aliphatic ketones; esters such as methyl acetate, ethyl acetate, and other alkyl carboxylic esters; ethers such as methyl t-butyl ethers, dibutyl ether, methyl phenyl ether, and other aliphatic or alkyl aromatic ethers; glycol ethers such as ethoxyethanol, butoxyethanol, ethoxypropanol, propoxyethanol, butoxypropanol, and other glycol ethers; glycol ether esters such as butoxyethoxy acetate, ethyl ethoxy propionate, and other glycol ether esters; alcohols such as methanol, ethanol, propanol, 2-propanol, butanol, amyl alcohol, and other aliphatic alcohols; aromatic hydrocarbons such as toluene, xylene, and other aromatics or mixtures of aromatic solvents; halocarbons; nitroalkanes such as 2-nitropropane. Generally, solvents suitable for this invention must have the desired solvency characteristics as aforementioned and also the proper balance of evaporation rates so as to insure good coating formation. A review of the structural relationships important to the choice of solvent or solvent blend is given by Dileep et al, Industrial and Engineering Chemistry Product Research and Development 24, 162, 1985 and Francis, A. W., Journal of Physical Chemistry 58, 1099, 1954.

In order to diminish or minimize the unnecessary release of any active solvent present in the liquid spray mixture, the amount of active solvent used should be less than that required to produce a mixture of polymeric compounds and active solvent having a viscosity which will permit its application by liquid spray techniques. In other words, the inclusion of active solvent(s) should be diminished or minimized such that the diluent effect due to the presence of the supercritical fluid diluent is fully utilized. Generally, this requires that the mixture of polymeric compounds and active solvent have a viscosity of not less than about 150 centipoise at spray temperature. Preferably, the solvent(s) should be present in amounts ranging from 0 to about 70 weight percent based upon the total weight of the polymer(s), solvent(s), and supercritical fluid diluent. Most preferably, the solvent(s) are present in amounts ranging from about 5 to 50 weight percent on the same basis.

The coating formulation employed in the process of the present invention includes polymeric compound(s), supercritical fluid diluent(s), and optionally, active solvent(s). Pigments, pigment extenders, metallic flakes, fillers, drying agents, antifoaming agents, antiskinning agents, wetting agents, ultraviolet absorbers, cross-linking agents, and other additives well known in the art may also be included in the compositions applied by the claimed process. A review of the use of coating additives in coating formulations is given by Lambourne, R., Editor, *Paint and Surface Coatings: Theory and Practice,* John Wiley & Sons, New York, 1987.

Solvents other than the active solvents may also be used in the practice of the present invention. These solvents are typically those in which the polymeric compound(s) have only limited solubility. However, these solvents are soluble in the active solvent and therefore constitute an economically attractive route to viscosity reduction of the spray mixture. Examples of these solvents include lower hydrocarbon compounds.

It is to be understood that a specific sequence of addition of the components of the liquid spray mixture (a), (b), and optionally (c) is not necessary in the practice of the present invention. However, it is often preferred to initially mix the polymer(s) (a) and any active solvent(s) (c) used, due to the relatively high viscosities normally exhibited by many polymer components.

The liquid mixture of (a), (b), and optionally (c) is sprayed onto a substrate to form a liquid coating thereon by passing the liquid mixture under pressure through an orifice into the environment of the substrate to form a liquid spray.

An orifice is a hole or an opening in a wall or housing, such as in a spray tip of a spray nozzle on an electrostatic spray gun, through which the liquid mixture of (a), (b), and optionally (c) flows in going from a region of higher pressure, such as inside the spray gun, into a region of lower pressure, such as the air environment outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional electrostatic airless and air-assisted airless spraying of coating formulations such as paints, lacquers, enamels, and varnishes, are suitable for spraying coating formulations with supercritical fluids, that is, for spraying the liquid mixture of (a), (b), and optionally (c). Spray guns, nozzles, and tips are preferred that do not have excessive flow volume between the orifice and the valve that turns the spray on and off. The spray guns may be automatic or hand spray. The spray guns, nozzles, and tips must be built to contain the spray pressure used.

The material of construction of the orifice is not critical in the practice of the present invention, provided the material possesses necessary mechanical strength for the high spray pressure used, has sufficient abrasion resistance to resist wear from fluid flow, and is inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for the practice of the present invention generally range from about 0.004-inch to about 0.072-inch diameter. Because the orifices are generally not circular, the diameters referred to are equivalent to a circular diameter. The proper selection is determined by the orifice size that will supply the desired amount of liquid coating and accomplish proper atomization for the coating. Generally smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore small orifice sizes from about 0.004-inch to about 0.025-inch diameter are preferred. Orifice sizes from about 0.007-inch to about 0.015-inch diameter are most preferred.

The designs of the spray tip that contains the spray orifice and of the spray nozzle that contains the spray tip are not critical to the practice of the present invention. The spray tips and spray nozzles should have no protuberances near the orifice that would interfere with the spray.

The shape of the spray is not critical to the practice of the present invention. The spray may be in the shape of a cone that is circular or elliptical in cross section or the spray may be in the shape of a flat fan, but the spray is not limited to these shapes. Sprays that are flat fans or cones that are elliptical in cross section are preferred. Wide-angle fans are most preferred.

The distance from the orifice to the substrate is not critical to the practice of the present invention. Generally the substrate will be sprayed from a distance of about 4 inches to about 24 inches. A distance of 6 inches to 18 inches is preferred. A distance of 8 inches to 14 inches is most preferred.

Devices and flow designs that promote turbulent or agitated flow in the liquid mixture prior to passing the liquid mixture under pressure through the orifice may also be used in the practice of the present invention. Such techniques include but are not limited to the use of pre orifices, diffusers, turbulence plates, restrictors, flow splitters/combiners, flow impingers, screens, baffles, vanes, and other inserts, devices, and flow networks that are used in electrostatic airless spray and air-assisted airless spray.

Filtering the liquid mixture prior to flow through the orifice is desirable in the practice of the present invention in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

The spray pressure used in the practice of the present invention is a function of the coating formulation, the supercritical fluid being used, and the viscosity of the liquid mixture. The minimum spray pressure is at or slightly below the critical pressure of the supercritical fluid. Generally the pressure will be below 5000 psi. Preferably the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used in the practice of the present invention is a function of the coating formulation, the supercritical fluid being used, and the concentration of supercritical fluid in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° centigrade. The maximum temperature is determined by the thermal stability of the components in the liquid mixture. The preferred spray temperature is between 35° and 90° centigrade. The most preferred temperature is between 45° and 75° centigrade. Generally liquid mixtures with greater amounts of supercritical carbon dioxide fluid require higher spray temperatures to counteract the greater cooling effect.

Figure 3:
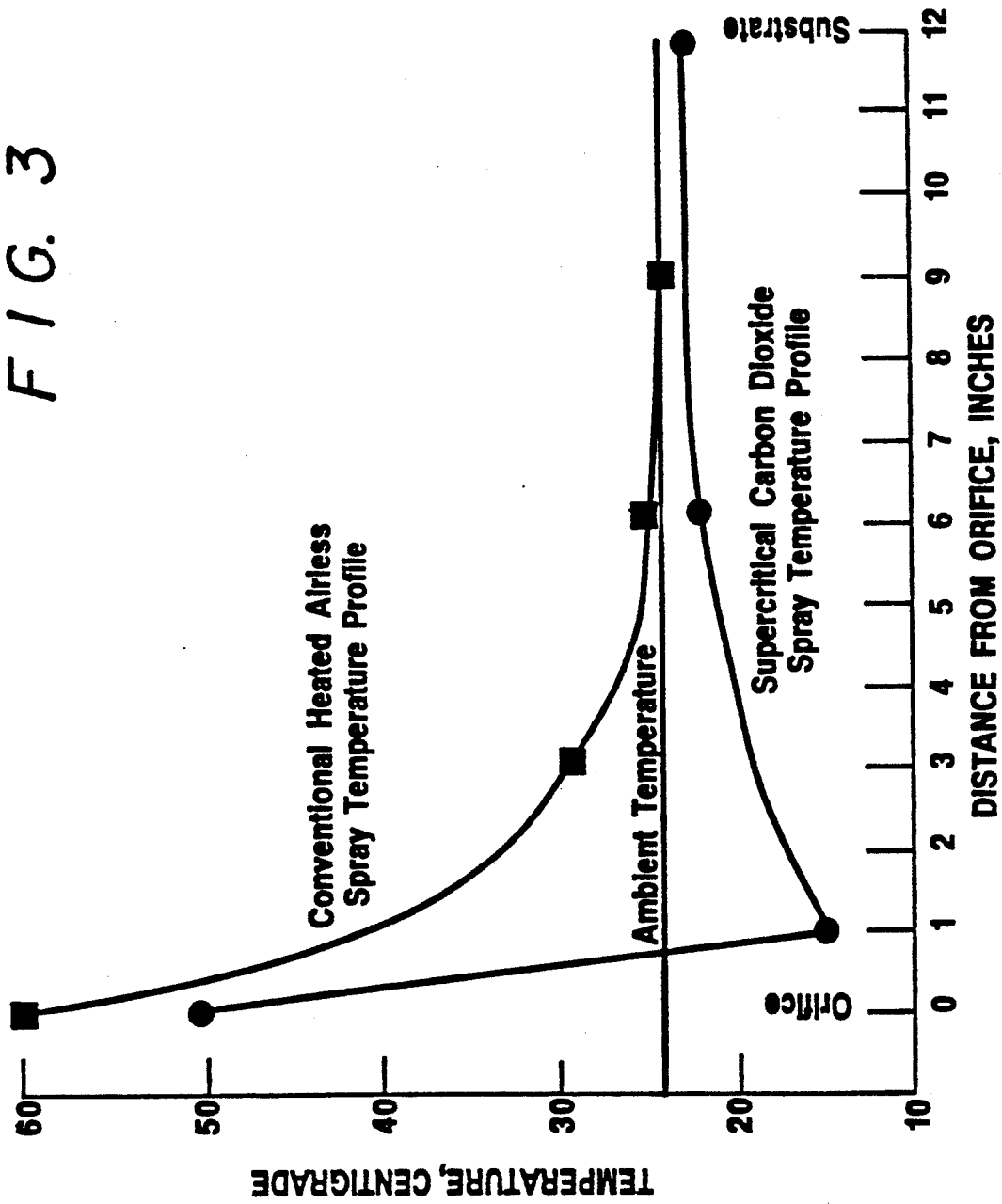
FIG. 3 is a graph illustrating the liquid spray temperature profiles for supercritical carbon dioxide fluid spray coating and for conventional heated airless spray coating.

The cooling effect of the supercritical carbon dioxide fluid on the spray temperature profile is illustrated in FIG. 3. Typically the spray undergoes rapid cooling while it is close to the orifice, so the temperature drops rapidly to near or below ambient temperature. If the spray cools below ambient temperature, entrainment of ambient air into the spray warms the spray to ambient or near ambient temperature before the spray reaches the substrate. This rapid cooling is beneficial, because less active solvent evaporates in the spray in comparison to the amount of solvent lost in conventional heated airless sprays. Therefore a greater proportion of the active solvent is retained in the coating formulation to aid leveling of the coating on the substrate. Conventional heated airless sprays also cool to ambient temperature before reaching the substrate, because of solvent evaporation and entrainment of ambient air.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment in which the liquid spray of the present invention is conducted is not narrowly critical. However, the pressure therein must be less than that required to maintain the supercritical fluid component of the liquid spray mixture in the supercritical state. Preferably, the present invention is conducted in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

In the practice of the present invention, liquid spray droplets are produced which generally have an average diameter of one micron or greater. Preferably, these droplets have average diameters of from about 5 to 1000 microns. More preferably, these droplets have average diameters of from about 10 to about 300 microns. Small spray droplets are desirable to vent the supercritical fluid from the spray droplet before impacting the substrate. Small spray droplets also give higher quality finishes.

The present process may be used to apply coatings by the application of liquid spray to a variety of substrates. The choice of substrates is therefore not critical in the practice of the present invention. Examples of suitable substrates include but are not limited to metal, wood, glass, plastic, paper, cloth, ceramic, masonry, stone, cement, asphalt, rubber, and composite materials.

Through the practice of the present invention, films may be applied to substrates such that the cured films have thicknesses of from about 0.2 to about 4.0 mils. Preferably, the films have thicknesses of from about 0.5 to about 2.0 mils, while most preferably, their thicknesses range from about 0.7 to about 1.5 mils.

If curing of the coating composition present upon the coated substrate is required, it may be performed at this point by conventional means, such as allowing for evaporation of the active solvent, application of heat or ultraviolet light, etc.

The present invention may utilize compressed gas to assist formation of the liquid spray and/or to modify the shape of the liquid spray that comes from the orifice. The assist gas is typically compressed air at pressures from 5 to 80 psi, with low pressures of 5 to 20 psi preferred, but may also be air with reduced oxygen content or inert gases such as compressed nitrogen, carbon dioxide, helium, argon, or xenon, or a mixture. Compressed oxygen or oxyqen enriched air is not desirable, because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the electrostatic spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably the flow rate and pressure of the assist gas are lower than those used in air spray. The assist gas may be heated to counteract the rapid cooling effect of the supercritical fluid diluent in the spray. The preferred temperature of heated assist gas ranges from about 35 to about 90 centigrade. The most preferred temperature ranges from about 45 to about 75 centigrade.

The invention is specifically directed to a liquid spray process in which the liquid spray mixture of (a), (b), and optionally (c) is electrically charged by a high electrical voltage relative to the substrate. Preferably the substrate is grounded, but it may also be charged to the opposite sign as the liquid mixture or spray. The substrate may be charged to the same sign as the liquid mixture or spray, but at a lower voltage with respect to ground, but this is of less benefit, because this produces a weaker electrical force of attraction between the spray and the substrate than if the substrate were electrically grounded or charged to the opposite sign. Electrically grounding the substrate is the safest mode of operation. Preferably the liquid mixture and/or liquid spray is charged negative relative to electrical ground.

The method of charging the liquid mixture and/or liquid spray is not critical to the practice of the invention provided the charging method is effective. The liquid coating formulation can be electrically charged by applying high electrical voltage relative to the substrate and electrical current (1) within the spray gun, by direct contact with electrified walls or internal electrodes before leaving the orifice; (2) after the liquid emerges from the orifice, by electrical discharge from external electrodes located near the orifice and close to the spray; or (3) away from the orifice, by passing the liquid spray through or between electrified grids or arrays of external electrodes before the spray is deposited onto the substrate. Methods (1) and (2), individually or in combination, are preferred. Method (2) is most preferred.

In charging method (1) above, the spray gun must be electrically insulating. The high voltage and electrical current is supplied to the liquid mixture inside the gun by direct contact with an internal surface that is electrically conducting and electrified. This may be part of the wall of the flow conduit inside the gun or internal electrodes that extend into the flow or a combination of electrified elements, including the spray nozzle. The contact area must be large enough to transfer sufficient electrical charge to the liquid mixture as it flows through the gun. This internal charging method has the advantage of having no external electrode that could interfere with the spray. A disadvantage is that if the liquid mixture is not sufficiently electrically insulating, electrical current leakage can occur through the liquid mixture to a grounded feed supply tank or feed delivery system. This reduces the amount of charge going to the spray. If current leakage is too high, then the feed supply tank and feed delivery system must be insulated from electrical ground, that is, be charged to high voltage. Current leakage can be measured by measuring the current flow from the high voltage electrical power supply without fluid flow. The current charging the spray is then the difference between the current with fluid flow and the current without fluid flow. The leakage current should be small compared to the charging current.

In charging method (2) above, the liquid is electrically charged after it emerges from the orifice or in the vicinity of the orifice. The spray gun and spray nozzle must be electrically insulating. The electrical charge is supplied from external electrode(s) close to the spray tip and adjacent to the spray. Under high electrical voltage, electrical current is discharged to the spray. The preferred electrodes are one or more metal wire(s) positioned adjacent to the spray. The electrodes may be either parallel to the spray or perpendicular to it or any orientation inbetween such that the electrical current issuing from the sharp point is favorably directed to the liquid spray. The electrode(s) must be positioned close enough to the spray, preferably within one centimeter, to effectively charge the spray without interfering with the flow of the spray. The electrodes may be sharp pointed and may be branched. For planar sprays, one or more electrodes are preferably located to the side(s) of the planar spray so that electrical current is discharged to the face(s) of the spray. For oval sprays, one or more electrodes are located adjacent to the spray around the perimeter. The electrode(s) are located to effectively charge the spray. One or more auxiliary electrodes, which may be at a different voltage than the primary electrode(s) or electrically grounded, may be used to modify the electrical field or current between the primary electrode(s) and the spray. For example, a primary charging electrode may be on one side of the spray fan and a grounded insulated auxiliary electrode may by on the opposite side of the spray fan. Charging method (2) has the advantage of less current leakage through the liquid mixture than charging method (1). Liquid mixtures that are sufficiently conductive must have the feed supply and feed line insulated from electrical ground.

In charging method (3) above, the liquid is electrically charged farther away from the orifice and is more fully dispersed than in method (2). Therefore a larger system or network of external electrodes is usually required in order to effectively charge the spray. Therefore the method is less safe and less versatile. Also the distance between the electrodes and spray must be greater to avoid interfering with the spray. Therefore the charge applied to the spray is likely to be lower. But current leakage through the supply lines is eliminated. The liquid spray is passed through or between electrified grids or arrays of external electrodes before the spray is deposited onto the substrate. The spray droplets are charged by ion bombardment from the electrical current discharged into air from the electrodes. The electrified grid may be one or several wire electrodes that extend across the spray area. Current can discharge from along the length of the electrodes. The electrified array may be one or several wire or pointed electrodes positioned around the spray area and which extend close to or into the spray such that current discharges from the ends of the electrodes.

The present invention can be used with high electrical voltage in the range of about 30 to about 150 kilovolts. Higher electrical voltages are favored to impart higher electrical charge to the liquid spray to enhance attraction to the substrate, but the voltage level must be safe for the type of charging and spray gun used. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 200 microamperes and optimum results are obtained with coating formulations that have very low electrical conductivity, that is, very high electrical resistance. For automatic spray guns that are used remotely, higher voltages and electrical currents can be safely used than for hand spray guns. Therefore the voltage can exceed 70 kilovolts up to 150 kilovolts and the current can exceed 200 microamperes.

These methods of electrostatic charging are known to those who are skilled in the art of conventional electrostatic spraying.

Supercritical carbon dioxide fluid surprisingly has been found to be an insulating solvent with good electrical properties for electrostatic spraying. The liquid sprays give good electrostatic wrap around the substrate. This shows that the droplets are highly charged and retain the electric charge.

Humid air can cause electrostatic sprays to lose their electrical charge more quickly than dry air; hence the electrostatic attraction to the substrate and wrap around is less effective. The supercritical carbon dioxide fluid diluent is beneficial for spraying in a humid environment, because the carbon dioxide as it vents from the spray tends to displace the humid air surrounding the spray. This helps the spray to retain its electric charge longer. When compressed air is used to assist electrostatic atomization, dry air is favored over humid air.

For electrostatic spraying, the substrate is preferably an electrical conductor such as metal. But substrates that are not conductors or semiconductors can also be sprayed. Preferably they are pretreated to create an electrically conducting surface. For instance, the substrate can be immersed in a special solution to impart conductivity to the surface.

The method of generating the high electrical voltage and electrical current is not critical to the practice of the current invention. High voltage electrical power supplies can be used in the same way as in conventional electrostatic spraying. The power supply should have standard safety features that prevent current or voltage surges. The electrical power supply may be built into the spray gun. Other charging methods may also be used.

The following examples are provided to further illustrate the invention. The examples are intended to be illustrative in nature and are not to be construed as limiting the scope of the invention.

EXAMPLE 1

The following Example illustrates the practice of the electrostatic supercritical fluid liquid spray process in a continuous mode.

Table 2 contains a listing of the equipment used in conducting the procedure described in the Example.

TABLE 2

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating. |
| 4. | Circle Seal TM pressure relief valve P168-344-2000 set at 1800 psig. |
| 5. | Vent valve. |
| 6. | Nitrogen gas supply. |
| 7. | Graco double-acting piston pump model #947-963 with 4-ball design and Teflon TM packings mounted in #5 Hydra-Cat Cylinder Slave Kit #947-943; pump and feed line are refrigeration traced; carbon dioxide pump. |
| 8. | Graco standard double-acting primary piston pump model #207-865 with Teflon TM packings; coating concentrate pump. |
| 9. | Graco Variable Ratio Hydra-Cat TM Proportioning Pump unit model #226-936 with 0.9:1 to 4.5:1 ratio range. |
| 10. | Graco President air motor model #207-352. |
| 11. | Utility compressed air at 95 psig supply pressure. |
| 12. | Graco air filter model #106-149. |
| 13. | Graco air pressure regulator model #206-197. |
| 14. | Graco air line oiler model #214-848. |
| 15. | Graco pressure relief valve model #208-317 set at 3000 psig. |
| 16. | Graco pressure relief valve model #208-317 set at 3000 psig. |
| 17. | Graco two-gallon pressure tank model #214-833. |
| 18. | Graco air pressure regulator model #171-937. |
| 19. | Graco pressure relief valve model #103-437 set at 100 psig. |
| 20. | Graco high-pressure fluid heater model #226-816. |
| 21. | Graco high-pressure fluid filter model #218-029. |
| 22. | Graco check valve model #214-037 with Teflon TM seal. |
| 23. | Graco check valve model #214-037 with Telfon TM seal. |
| 24. | Graco static mixer model #500-639. |
| 25. | Graco high-pressure fluid heater model #226-816. |
| 26. | Graco high-pressure fluid filter model #218-029. |
| 27. | Kenics static mixer. |
| 28. | Graco fluid pressure regulator model #206-661. |
| 29. | Jerguson high-pressure site glass series T-30 with window size #6 rated for 2260 psig pressure at 200 F temperature. |
| 30. | Electrostatic spray gun. |
| 31. | Bonderite TM 37 polished 24-gauge steel panel, 6-inch by 12-inch size. |
| 32. | Zenith single-stream gear pump, model #HLB-5592-30C, modified by adding a thin Telfon TM gasket to improve metal-to-metal seal, with pump drive model #4024157, with 15:1 gear ratio, and pump speed controller model #QM-371726F-15-XP, with speed range of 6 to 120 revolutions per minute. |
| 33. | Circle Seal TM pressure relief valve P168-2000 set at 2000 psig. |
| 34. | Drain from circulation loop. |

The apparatus listed in Table 2 above was assembled as shown in the schematic representation contained in FIG. 4. Rigid connections were made with Dekuron ¼-inch diameter, 0.036 inch thick, seamless, welded, type 304 stainless steel hydraulic tubing ASTM A-269 with 5000-psi pressure rating, using Swagelok TM fittings. The pressure tank (17) was connected to the pump (8) using a Graco ⅜-inch static-free nylon high-pressure hose model #061-221 with 3000 psi pressure rating. All other flexible connections were made using Graco ¼-inch static-free nylon high-pressure hoses model #061-214 with 5000-psi pressure rating.

The coating concentrate and carbon dioxide were pumped and proportioned by using a Graco Variable Ratio Proportioning Pump unit (9). It proportions two fluids together at a given volume ratio by using two piston pumps (7 and 8) that are slaved together. The piston rods for each pump are attached to opposite ends of a shaft that pivots up and down on a center fulcrum. The volume ratio is varied by sliding pump (7) along the shaft, which changes the stroke length. The pumps are driven on demand by an air motor (10). Pumping pressure is controlled by the air pressure that drives the air motor. The pumps are double-acting; they pump on upstroke and downstroke. The primary pump (8) was used to pump the coating concentrate. It was of standard design, having one inlet and one outlet. It fills through a check valve at the bottom and discharges through a check valve at the top. A third check valve is located in the piston head, which allows liquid to flow from the bottom compartment to the top compartment when the piston is moving downward. This type of pump is designed to be used with low feed pressure, typically below 100 psi. The coating concentrate was supplied to the primary pump (8) from a two-gallon pressure tank (17). After being pressurized in the pump to spray pressure, the solution was then heated in an electric heater (20) to reduce its viscosity (to aid mixing with carbon dioxide), filtered in a fluid filter (21) to remove particulates, and fed through a check valve (22) into the mix point with carbon dioxide. The secondary pump (7) on the proportioning pump unit (9) was used to pump the liquid carbon dioxide. A double-acting piston pump (7) with a four check-valve design was used because of the high vapor pressure of carbon dioxide. The pump has an inlet and an outlet on each side of the piston; no flow occurs through the piston. The proportion of carbon dioxide pumped into the spray solution is varied by moving the secondary pump (7) along the moving shaft. The carbon dioxide pump was positioned to give 46% of maximum piston displacement. The carbon dioxide feed line and circulation loop were filled with carbon dioxide and vented through valve (34) several times to purge air from the system. Then the valves to the mixing point were closed and the carbon dioxide feed line was filled to prime pump (7). The liquid carbon dioxide was pumped from Hoke cylinder (3), which was filled from cylinder (1) by venting (5) gaseous carbon dioxide. The cylinder was pressurized with nitrogen (5) to a pressure of 1050 psig to prevent cavitation in the carbon dioxide pump. The cylinder (3) was mounted on a 16-kilogram Sartorius electronic scale with 0.1-gram sensitivity so that the uptake of carbon dioxide could be measured. after being pressurized to spray pressure in pump (7), the liquid carbon dioxide was fed unheated through check valve (23) to the mix point with the coating concentrate. After the coating concentrate and carbon dioxide were proportioned together at the mix point, the mixture was mixed in static mixer (24) and pumped on demand into a circulation loop, which circulates the mixture at spray pressure and temperature to the spray gun (30). The mixture was heated in an electric heater (25) to obtain the desired spray temperature and filtered in a fluid filter (26) to remove particulates. Fluid pressure regulator (28) was installed to lower the spray pressure below the pump pressure, if desired, or to help maintain a constant spray pressure. A Jerguson site glass (29) was used to examine the phase condition of the mixture. Circulation flow in the circulation loop was obtained through the use of gear pump (32).

A clear acrylic coating concentrate having a total weight of 7430 grams was prepared by mixing the following materials:
4830 grams of Rohm & Haas Acryloid TM AT-400 Resin, which contains 75% nonvolatile acrylic polymer dissolved in 25% methyl amyl ketone solvent,
1510 grams of American Cyanamid Cymel TM 323 Resin, which is a cross-linking agent that contains 80% nonvolatile melamine polymer dissolved in 20% isobutanol solvent,
742 grams of methyl amyl ketone solvent,
348 grams of n-butanol solvent.

The coating concentrate contained 65.0% nonvolatile polymer solids and 35.0% volatile organic solvent. The pressure tank (17) was filled with the concentrate and pressurized with air to 50 psig. The coating concentrate primary pump (8) was primed by opening a drain valve on the bottom of filter (21) until air was purged from the line.

The air pressure regulator (13) was adjusted to supply the air motor (10) with air at a pressure of 67 psig to pressurize the feed lines. The valves to the mix point were opened and the circulation loop filled with material. With the circulation loop return valve closed, to give plug flow around the circulation loop with no backmixing, material was drained from valve (34) until a uniform composition was obtained. The coating concentrate heater (20) was adjusted to give a feed temperature of 40 C. The circulation heater (25) was adjusted to give the spray temperature. The circulation loop return valve was opened and the spray mixture was circulated at a high rate by adjusting the gear pump (32) to a rate of 35 revolutions per minute.

The spray gun (30) was a Graco electrostatic airless hand spray gun model AL4000 with circulating adapter #208-433 and 2000-psig maximum working pressure. The spray tip was #270-411, which has a 0.011-inch orifice diameter and a fan width rating of 8–10 inches at a distance of twelve inches. The spray was charged by a single external electrode, which was a short wire positioned about 7 millimeters in front of the orifice from an extension of the spray tip. The wire electrode was perpendicular to the plane of the spray and extended to about 2 millimeters from the centerline of the spray. The spray gun housing and spray tip housing were made of electrically insulating materials. The power supply was a Graco 75-kilovolt power supply model PS7500 with a high-voltage cable and a switch cable attached to the spray gun. The power supply, spray gun, panel, and other equipment were electrically grounded.

The liquid spray mixture contained approximately 47% nonvolatile polymer solids, 25% volatile organic solvent, and 28% carbon dioxide. The spray pressure was 1550 psig and the spray temperature was 58 C. The spray mixture was a clear single phase solution. Test panels were mounted vertically, held by a magnet attached to a grounded vertical pole. A high electrical voltage of 60 kilovolts was applied to the external electrode on the spray gun as two panels were sprayed. This produced an electrostatic current of 25 microamperes. Both panels showed good wrap around of coating deposited onto the back side of the panels. Coating extended continuously inward from the back edges of the panels. Thin coating was deposited all the way to the center of the backside of the panels. This showed that the spray was electrically charged, that the charge was retained by the droplets in the spray, and that the charged droplets were electrostatically deposited onto the panel. During the spraying, some foam grew on the electrode, because the outside of the fan grazed it, but this did not interfere with charging the spray. However, droplets of foam were entrained from the electrode into the spray and were deposited onto the coatings. The 25-microampere current level showed that the spray mixture with supercritical carbon dioxide fluid was electrically insulating, so that electrical current did not leak back to the grounded equipment. No electrically charged mist was observed being given off from the periphery of the spray. Then two panels were sprayed the same way with no applied electrical voltage, to establish reference coatings; this showed that no coating is deposited onto the back side of the panels when the spray is not electrostatically charged. This demonstrated that more coating material was deposited on the panels when the spray was electrically charged and therefore that the transfer efficiency was increased. The panels were baked in an oven at a temperature of 120 C. for twenty minutes. The panels were covered by thin clear glossy coherent polymeric coatings.

EXAMPLE 2

The same apparatus and procedure were used as in Example 1, except that refrigeration was used to control cavitation in the carbon dioxide pump instead of pressurization with nitrogen. Liquid carbon dioxide was pumped directly from cylinder (1) through refrigeration heat exchanger (2) to carbon dioxide pump (7). For measuring the carbon dioxide uptake rate, the carbon dioxide was pumped from Hoke cylinder (3) through heat exchanger (2) to pump (7). The refrigeration flow was adjusted to a temperature of −10 C. and circulated through the refrigeration heat exchanger (2) and refrigeration tracing on pump (7). The carbon dioxide temperature at pump (7) was −3 C. The carbon dioxide bulk cylinder pressure was 850 psig. The carbon dioxide pump was positioned to give 45% of maximum piston displacement.

A blue metallic acrylic enamel coating concentrate was prepared by mixing the following materials:
two gallons of Du Pont Centari TM Acrylic Enamel B8292A Medium Blue Metallic Auto Refinish Paint,
736 grams of ethyl 3-ethoxy-propionate,
240 grams of butyl CELLOSOLVE TM acetate,
8 pumps of Auto Fisheye eliminator.

This paint is normally reduced before usage with thinner (Du Pont 8034S Acrylic Enamel Reducer) in the amount of adding one gallon of thinner to two gallons of paint. But no Acrylic Enamel Reducer was used. Because the paint contains a large proportion of low-boiling-point solvent, small amounts of ethyl 3-ethyocy-propionate and butyl acetate were added to increase the proportion of high-boiling-point solvent, to aid leveling of the coating. Therefore the coating concentrate contained three-quarters of a gallon less volatile organic solvent than normally reduced paint.

The spray temperature was 50 C. and the spray pressure was 1600 psig. The spray mixture contained 30.8% carbon dioxide. The carbon dioxide was fully soluble in the paint. Test panels were hand sprayed, flashed for a few minutes, and baked in an oven at a temperature of 60 C. for one hour.

Coating thickness was measured at nine places (spaced as an array) on each panel by using a magnetic coating thickness meter (Paul N. Gardner Company, Fort Lauderdale, Fla.). Coating gloss was measured by using Glossgard TM II 20-Degree and 60-degree Glossmeters (Gardner/Neotec Instrument Division, Pacific Scientific Company, Silver Spring, Md.), which measures the intensity of a beam of light reflected off of the coating at an angle of twenty degrees or sixty degrees from perpendicular. Gloss was measured at the top, center, and bottom of each panel. Coating distinctness of image was measured at the center of each panel by using a Distinctness of Image Meter, Model 300 (Mechanical Design and Engineering Company, Burton, Mich.), which is a viewing box in which the clarity of images reflected off of the coating and reference surfaces are compared.

The electrostatic airless spray gun was the same as in Example 1. The electrostatic spray tip was Graco #271-410, which has a 0.010-inch orifice diameter and a fan width rating of 8-10 inches.

First, several panels were sprayed as references with no applied electrical voltage; this showed that no coating is deposited onto the back side of the panels. However, some of the spray hit the electrode and formed foam that was entrained into the spray and deposited onto the coating as large drops. The coating deposition was uniform (except for the scattered drops from the electrode), but the metallic appearance was slightly mottled. The coatings were bubble free. The properties of these coatings are given below.

| Spray Temperature | Spray Pressure | Average Thickness | 20-Degree Gloss | 60-Degree Gloss | Distinct. of Image |
|---|---|---|---|---|---|
| 50 C | 1600 psi | 0.93 mil | 62% | 87% | 60% |
| 50 C | 1600 psi | 0.94 mil | 61% | 87% | 60% |
| 50 C | 1600 psi | 1.10 mil | 71% | 89% | 65% |

Then a high electrical voltage of 68 kilovolts was applied to the charging electrode. This produced an electrostatic current of 28 microamperes while spraying. This showed that the spray mixture was electrically insulating so that charge leakage did not occur. Electrically grounded test panels were sprayed with a high electrical voltage of 60 kilovolts applied to the charging electrode. Coating was deposited well onto the back side of the panels, which showed that the droplets were being electrically charged, were retaining their electrical charge, and were being attracted to the panel by electrical force. This demonstrates that transfer efficiency was increased. As before, some of the spray hit the electrode and formed foam, which was entrained into the spray and was deposited onto the coating as large drops. This did not interfere with the charging. The coatings had the same appearance as the reference coatings, except that the edges were somewhat darker in color. This showed that deposition was heavier along the edges of the panel because of the electrostatic attraction. The properties of these coatings are given below.

| Spray Temperature | Spray Pressure | Average Thickness | 20-Degree Gloss | 60-Degree Gloss | Distinct. of Image |
|---|---|---|---|---|---|
| 50 C | 1600 psi | 0.89 mil | 51% | 83% | 55% |
| 50 C | 1600 psi | 0.90 mil | 58% | 87% | 55% |
| 50 C | 1600 psi | 0.90 mil | 59% | 87% | 60% |

EXAMPLE 3

The apparatus, procedure, coating concentrate, spray mixture, electrostatic spray gun, and spray tip were the same as in Example 2.

The spray temperature was 50 C. and the spray pressure was 1850 psig. Electrically grounded panels were sprayed with a high electrical voltage of 60 kilovolts applied to the charging electrode. Coating was deposited well onto the back side of the panels, which showed that the droplets were being deposited electrostatically. The higher spray pressure than in Example 2 produced a metallic paint coating with less mottled appearance and better metallic laydown. The higher pressure also increased the amount of spray that hit the electrode, but this did not interfere with the charging. More foam was entrained into the spray and deposited onto the coating as large drops. The coatings had the following properties:

| Spray Temperature | Spray Pressure | Average Thickness | 20-Degree Gloss | 60-Degree Gloss | Distinct. of Image |
|---|---|---|---|---|---|
| 50 C | 1850 psi | 0.73 mil | 41% | 79% | 50% |
| 50 C | 1850 psi | 0.78 mil | 35% | 74% | 40% |

EXAMPLE 4

The apparatus, procedure, coating concentrate, spray mixture, electrostatic spray gun, and spray tip were the same as in Example 3.

The spray temperature was 60 C. and the spray pressure was 1900 psig. Electrically grounded panels were sprayed with a high electrical voltage of 60 kilovolts applied to the charging electrode. Coating was deposited well onto the back side of the panels, which showed that the droplets were being deposited electrostatically. The coatings obtained were uniform in gloss, color, and metallic appearance; they were not mottled as in Examples 2 and 3. However, as before, some of the spray hit the electrode and formed foam, which was entrained into the spray and deposited onto the coatings. The coatings had the following properties:

| Spray Temperature | Spray Pressure | Average Thickness | 20-Degree Gloss | 60-Degree Gloss | Distinct. of Image |
|---|---|---|---|---|---|
| 60 C | 1900 psi | 0.59 mil | 35% | 73% | 40% |
| 60 C | 1900 psi | 0.68 mil | 41% | 79% | 45% |
| 60 C | 1900 psi | 0.77 mil | 48% | 83% | 45% |
| 60 C | 1900 psi | 0.99 mil | 45% | 80% | 45% |
| 60 C | 1900 psi | 1.00 mil | 49% | 84% | 50% |
| 60 C | 1900 psi | 1.03 mil | 57% | 86% | 55% |

To prevent the spray from hitting the electrode, the electrode was then bent farther outward from the spray. This did not affect the charging, because at a high electrical voltage of 67 kilovolts, the same electrostatic current of 28 microamperes was produced. No spray hit the repositioned electrode, so no droplets of foam were deposited onto the coatings. Good coatings were sprayed that were uniform in gloss, color, and metallic appearance (except for being somewhat darker along the edges due to enhanced electrostatic deposition). The metallic particles were properly and uniformly laid down and oriented to reflect light. The coatings were bubble free. All panels showed good electrostatic wrap around of coating deposited onto the back side of the panels. Coating gloss and distinctness of image increased with thickness. The coatings had the following average properties:

| Spray Temperature | Spray Pressure | Average Thickness | 20-Degree Gloss | 60-Degree Gloss | Distinct. of Image |
|---|---|---|---|---|---|
| 60 C | 1900 psi | 0.58 mil | 36% | 74% | 40% |
| 60 C | 1900 psi | 0.61 mil | 30% | 70% | 40% |
| 60 C | 1900 psi | 0.69 mil | 40% | 78% | 40% |
| 60 C | 1900 psi | 0.72 mil | 40% | 79% | 45% |
| 60 C | 1900 psi | 0.73 mil | 39% | 78% | 45% |
| 60 C | 1900 psi | 0.82 mil | 47% | 82% | 55% |
| 60 C | 1900 psi | 0.94 mil | 50% | 84% | 55% |
| 60 C | 1900 psi | 0.94 mil | 52% | 84% | 55% |

For comparison. paint reduced with thinner was prepared by adding Du Pont 8034S Acrylic Enamel Reducer to the Du Pont Centari TM Metallic Paint in the proportion of one gallon of thinner to two gallons of paint. Test panels were sprayed by using a conventional air spray gun. The properties of the coatings are given below. The metallic appearance of the coatings sprayed with supercritical carbon dioxide fluid was more uniform than that of the air sprayed coatings.

| Average Thickness | 20-Degree Gloss | 60-Degree Gloss | Distinct. of Image |
|---|---|---|---|
| 0.89 mil | 64% | 88% | 65% |
| 1.19 mil | 68% | 88% | 60% |

EXAMPLE 5

The apparatus, procedure, coating concentrate, spray mixture, electrostatic spray gun. and spray tip were the same as in Example 4. The electrode was repositioned as in Example 4 to prevent spray from hitting it.

The spray temperature was 60 C. and the spray pressure was 1900 psig. An unused empty one-gallon metal paint can was mounted on the grounded panel holder with its axis horizontal and with the open end pointed towards the spray gun. As a reference, the can was sprayed with no applied electrical voltage. The spray gun was kept parallel to the axis of the can. The can was sprayed from a distance of 10 to 12 inches. Paint was deposited only on the rim of the can. No paint was deposited on the sides or back of the can.

Then another can was mounted and sprayed in the same manner, but with a high electrical voltage of 67 kilovolts applied to the charging electrode. The electrostatic current was 28 microamperes. The electrostatic deposition caused paint to completely coat the outside of the can and to be deposited around onto the back end of the can. The electrostatic deposition also coated the inside walls of the can and paint was deposited on the inside end of the can. This demonstrates the throwing power and the electrostatic wrap around of the electrostatic airless spray created with supercritical carbon dioxide fluid. Several more cans were sprayed in the same manner with the same results. The paint deposited on the sides of the cans had the same appearance as the coatings sprayed onto the test panels, except that the coating thickness decreased as the distance from the spray increased. No coating material struck the electrode.

What is claimed is:

1. An apparatus for electrostatic liquid spray application of a coating to a substrate wherein the use of environmentally undesirable organic solvent is diminished, said apparatus comprised of, in combination:
   (1) a source of supercritical fluid;
   (2) means for supplying at least one polymeric compound capable of forming a continuous, adherent coating;
   (3) means for supplying at least one active organic solvent;
   (4) means for supplying supercritical fluid from said source;
   (5) means for forming a liquid mixture of components supplied from the means for supplying at least one polymeric compound capable of forming a continuous, adherent coating, the means for supplying at least one active organic solvent and the means for supplying supercritical fluid from said source;
   (6) means for spraying said liquid mixture onto a substrate by passing the mixture under pressure through an orifice into the environment of the substrate to form a liquid spray containing droplets having an average diameter of 1 micron or greater; and
   (7) means for electrically charging the liquid by a high electrical voltage relative to the substrate.

2. The apparatus of claim 1 further comprising (8) means for heating any of said components of said liquid mixture.

3. The apparatus of claim 1 further comprising (9) means for heating said liquid mixture.

4. The apparatus of claim 1 further comprising (10) means of pressurizing said liquid mixture.

5. The apparatus of claim 1 further comprising (11) means for filtering said liquid mixture.

6. The apparatus of claim 1 further comprising (12) means for promoting turbulent or agitated flow of said liquid mixture.

7. The apparatus of claim 1 further comprising (13) means for utilizing jets of compressed gas to assist formation and atomization of said liquid spray and to modify the shape of said liquid spray.

8. The apparatus of claim 7 further comprising (14) means for heating said compressed gas.

9. The apparatus of claim 1 in which the orifice size ranges from about 0.004 to about 0.072 inch.

10. The apparatus of claim 1 in which the means for electrically charging said liquid spray is at least one electrified surface that said liquid mixture contacts before leaving the orifice.

11. The apparatus of claim 10 in which said electrified surface is a wall of a conduit through which said liquid mixture flows.

12. The apparatus of claim 11 in which the electrified surface is a spray tip in a spray gun.

13. The apparatus of claim 10 in which said electrified surface is an electrified internal electrode that extends into the flow of said liquid mixture.

14. The apparatus of claim 1 in which the means for electrically charging said liquid spray is at least one electrified external electrode located near the orifice and close to the spray.

15. The apparatus of claim 13 in which the electrified external electrode is a metal wire.

16. The apparatus of claim 1 in which the means for electrically charging said liquid spray is an electrode system consisting of at least one external electrode located away from the orifice which the liquid spray passes through before being deposited onto the substrate.

* * * * *